Dec. 3, 1968     G. DE COYE DE CASTELET     3,414,335

VARIABLE-RELUCTANCE DECELERATION DETECTORS

Filed Aug. 26, 1966

— # United States Patent Office 3,414,335
Patented Dec. 3, 1968

3,414,335
VARIABLE-RELUCTANCE DECELERATION DETECTORS
Gaëtan de Coye de Castelet, Billancourt, France, assignor to Regie Nationale des Usines Renault, Billancourt, France
Filed Aug. 26, 1966, Ser. No. 575,439
Claims priority, application France, Sept. 9, 1965, 30,951
7 Claims. (Cl. 303—21)

ABSTRACT OF THE DISCLOSURE

A device for controlling the actuation of a fluid actuated braking system in automotive vehicles and comprising a fixed magnetic pickup and a magnetic mass-inertial member responsive to wheel motion to move axially with respect to the pickup thereby varying the reluctance. An oscillator feeds alternating current to the pickup which in turn controls a threshold amplifier adapted to actuate an electromagnetic valve in the braking system. The mass and member are so mounted that limited angular movement with respect to the wheel will cause the above-mentioned axial movement thereby effecting the desired control function.

---

This invention relates to a deceleration detector for automotive vehicle which is adapted, when the brakes of a vehicle are applied on a road surface having a poor adherence, to prevent the locking of wheels equipped with fluid-actuated brake control means.

This deceleration detector comprises deceleration-responsive mechanical means mounted on the wheel and adapted to operate a contactless pickup controlling one or a plurality of electromagnetic valves regulating in turn the brake fluid pressure as a function of deceleration variations. The function of this detector is to reduce the braking pressure when the deceleration exceeds normal values.

According to this invention, each wheel, the braking of which is to be controlled, has associated therewith a magnetic pickup solid with the wheel support or carrier member and registering with the surface of a magnetic or ferromagnetic mass so mounted as to be movable in relation to said pickup, whereby its axial displacement in relation to the wheel may cause a variation in the pickup reluctance. The device according to this invention comprises an inertia member rotatably mounted about the wheel axis, the permissible angular movements of this member in relation to said wheel being limited and producing said axial movement. Resilient means disposed between the wheel concerned and its inertia member constantly urge said inertia member in the direction of rotation opposite to the direction of forward rotation of the wheel. Said pickup is fed with alternating current from an oscillator and controls a threshold-type amplifier actuating at least one electromagnetic valve for controlling the pressure of the brake fluid.

Thus, the pickup constitutes a contactless detector capable of measuring the variation in reluctance of the pickup to mechanical-means circuit. To this reluctance variation corresponds the inductance or mutual-inductance variation of the pickup supplied with alternating current. Thus, the sensitiveness of the device is independent of the velocity of rotation.

Figure 1:
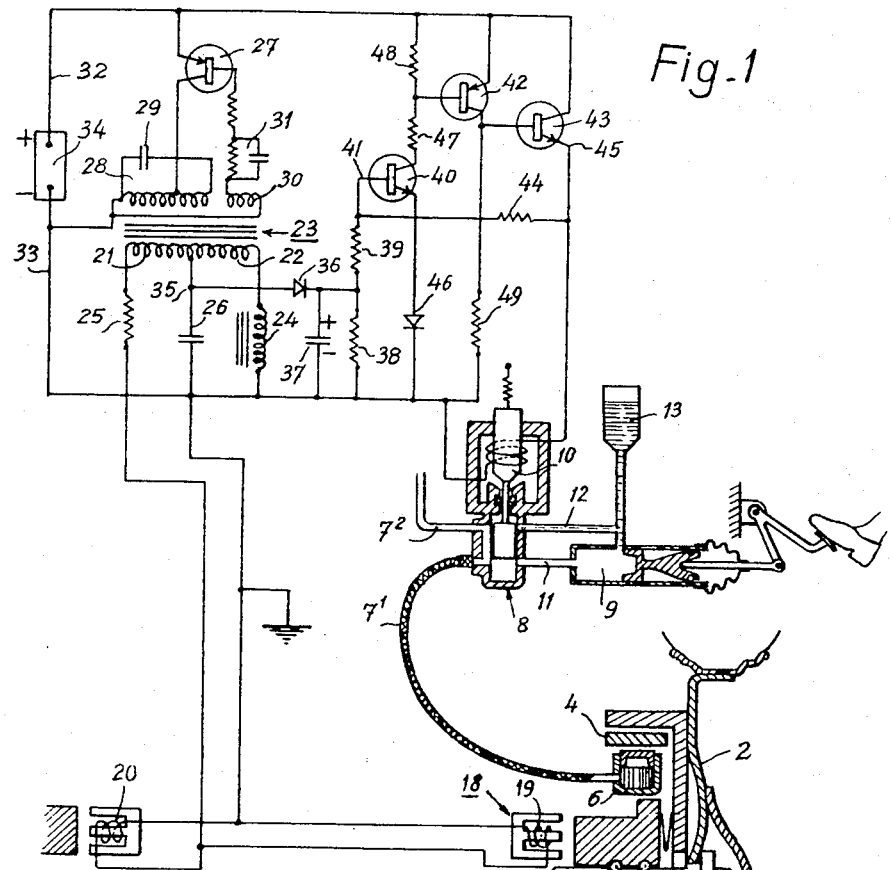
Figure 2:
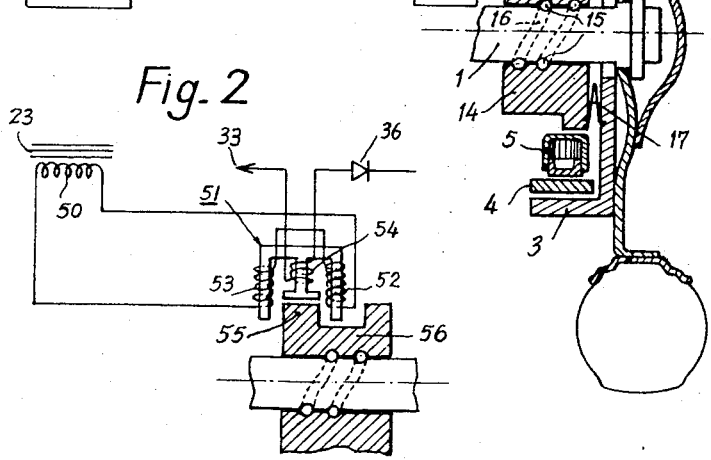

A specific form of embodiment of the device according to this invention will no be described by way of example with reference to the attached drawing in which:

FIGURE 1 illustrates diagrammatically in axial section a wheel of a vehicle and the braking members associated therewith, together with the electronic control circuit, and
FIGURE 2 shows a modified form of embodiment of the pickup illustrated in FIGURE 1.

A cylindrical member 1, for example the axle of a rear wheel, is rigid with a wheel 2 carrying a brake drum 3 adapted to have its inner surface frictionally engaged by the brake shoes 4 under the control of receiving brake cylinders 5 and 6 disposed separately or in a common casing. These brake cylinders are adapted to be supplied with control fluid under pressure from a master cylinder 9 through a pipe line $7^1$ and a three-way electromagnetic valve 8. Another pipe line $7^2$ is adapted to supply brake fluid to the other wheel of the same axle (not shown in the figure).

When the electromagnetic valve coil 10 is deenergized the communication between pipe lines $7^1$ and $7^2$ on the one hand, and the output line 11 of master-cylinder 9, on the other hand, is established and the wheels ar normally braked. Alternately, if this coil 10 is energized the aforesaid communication is cut-off and pipe lines $7^1$ and $7^2$ discharge into the fluid reservoir 13 the brake fluid through a return pipe line 12, the wheel braking action being thus eliminated or at least reduced.

The arrangement of parts numbered 1 to 13 is already known per se and conventional in the art.

The deceleration detector according to this invention consist of an inertia member 14 in the form of an annular mass or block driven by the wheels under acceleration conditions by abutment members (not shown), this inertia member 14 being adapted to be shifted both angularly and axially along the cylindrical wheel member 1 if the deceleration produced as a consequence of a brake application exceeds a predetermined value. To this end, the inertia member 14 and cylindrical axle member 1 are mechanically interconnected by means of one or a plurality of balls 15 circulating in corresponding helical grooves, and hairpin-or like springs 17 having one end attached to the wheel and the other end attached to the aforesaid inertia member 14 create a force counteracting the inertia member displacement caused by the deceleration of wheel 2. Of course, the axial movement from a rotational motion may be obtained through any other known helical guide means or system.

A magnetic-circuit pickup 18 of the open pot-core type registers with the aforesaid inertia member 14 consisting of ferromagnetic material. Any axial displacement of inertia member 14 will cause the reluctance of the circuit and therefore the self-inductance of the pickup coil 19 to vary. This coil is connected in parallel with the pickup coil 20 of the other wheel of the same axle and constitutes a member of 'a measuring bridge comprising the symmetrically arranged windings 21 and 22 of a transformer 23 which constitute one of the bridge sides, the other side consisting of the aforesaid coils 19 and 20, on the one hand, and coil 24, on the other hand, coil 24 constituting a reference coil. A resistance 25 balances the ohmic resistances and a capacitor 26 approximately tunes the circuit at the working frequency while filtering any undesired harmonics. This working frequency is supplied from an oscillator consisting of a PNP-type transistor 27 having its collector connected to a tap of an oscillating circuit consisting of a winding 28 of transformer 23 and of a capacitor 29, a reaction winding 30 recovering through a resistance-capacitor unit 31 one fraction of the oscillating energy towards the base of transistor 27 which is supplied through the positive output line 32 and the negative output line 33 of a storage battery 34.

The circuit point 35 common to the balanced windings 21 and 22 is connected through a diode 36 to a resistance-capacitor unit 37–38 having its other ends connected to the negative line 33 of storage battery 34. This resistance-capacitor unit is connected through a resistance 39 to the base 41 of a NPN-type transistor 40 constituting in conjunction with transistors 42 and 43 a monostable multivibrator of which the input-to-output reaction is obtained through a resistance 44 inserted between the emitter 45 of transistor 43 and the base 41 of transistor 40. The coil 10 of electromagnetic valve 8 connects the emitter 45 to the negative battery line 33 and constitutes the charging circuit of the multivibrator. A voltage threshold obtained by a diode 46 is connected to the emitter of transistor 40 whereby this emitter will react only beyond a predetermined voltage fed to its base. Resistances 47, 48 and 49 are inserted to limit the currents or determining the reference potential of the intermediate electrodes of the multivibrator.

The above-described device operates as follows:

At the rated value of the gap between the pickups 18 and the inertia members 14, the inductance of coils 19 and 20 equals that of winding 24 and the alternating voltage obtained between point 35 and the negative line 33 is very low. Now if one of the inertia members 14 is slightly moved in the axial direction as a consequence of a strong deceleration, the bridge balance is impaired and the output voltage at point 35 as detected by circuit 36, 37 and 38 will control the supply of energizing current to the electromagnetic valve coil 10 through the multivibrator, whereby transistors 40, 42 and 43 thereof will become conductive. The braking pressure is thus reduced in the wheels concerned until the inertia member 14 resumes its initial position, the deceleration having resumed a value below the adjustment threshold and the voltage across the terminals of capacitor 37 being again lower than the threshold of the monostable multivibrator.

The control device illustrated in FIGURE 1 is used for braking of the rear wheels of a vehicle equipped with conventional drum brakes, but anybody conversant with the art will readily understand that this control device is applicable as well to a fully- or partially-assisted braking system, such as servo-action braking systems.

The device according to this invention is also advantageous in that simple pickup means comprising only one coil and one connecting wire can be used, the return path being through the chassis of the vehicle. The use of pickups consisting of bodies of revolution is also advantageous in that the gap can be adjusted by simply screwing the pickup in or out in the fixed brake cover or anchor plate.

In the alternate form of embodiment illustrated in FIGURE 2 of the drawing the pickup 51 is of the mutual-inductance type and comprises on its side arms a pair of oppositely connected coils 52 and 53 fed through the winding 50 of transformer 23. A central coil 54 collects the voltage produced by the difference in alternating flux between the two side arms when the shoulder 55 of the inertia member 56 is axially moved as a consequence of a strong deceleration. The voltage of this central coil 54 is fed to a circuit point lying between the negative line 33 and the diode 36 substituted for the bridge 21, 22, 24, 25 of FIGURE 1.

I claim:

1. A device for controlling the application of braking to the wheels of an automotive vehicle equipped with a fluid actuated braking system comprising, for each wheel to be controlled, magnetic pickup means rigidly mounted on a wheel carrying member, an inertia member and magnetic mass rotatably mounted on the wheel axle in a manner permitting a limited angular movement of said member and mass in relation to said wheel to produce axial movement along said axle, resilient means attached between said wheel and the inertia member associated therewith for biasing said inertia member in the direction opposite the forward direction of rotation of the wheel, oscillator means operatively connected to feed alternating current to said pickup means, threshold amplifier means responsively connected to said pickup means and operatively connected to control electromagnetic valve means in said braking system, whereby axial movement of said magnetic mass with respect to said pickup causes a variation in reluctance which in turn causes an output from said amplifier to actuate said valve means and thereby control the pressure of the braking fluid.

2. A control device according to claim 1 wherein said magnetic mass and said inertia member are an integral annular member mounted about a cylindrical portion of said wheel, ball and helical groove guide means provided between said cylindrical portion and said member whereby relative rotation between said wheel and said member causes relative axial displacement of said member.

3. A control device according to claim 1 wherein said pickup means comprises a measuring bridge circuit one coil of which forms said pickup means and another coil of which has a fixed inductance value.

4. A control element according to claim 3 wherein two coils of said bridge are coupled to said oscillator.

5. A control device according to claim 1 wherein said threshold oscillator comprises a monostable multivibrator having three complementary transistors, said electromagnetic valve being connected to the emitter of the output transistor.

6. A control device according to claim 1 wherein at least two pickup means are connected in parallel to control a single electromagnetic valve controlling distribution of braking fluid to both corresponding wheels.

7. A control device according to claim 6 wherein said pickup means is of the mutual inductance type comprising three coils, two of said coils being oppositely connected, said pickup means delivering a negligible voltage to its output coil as long as said magnetic mass is within its pre-adjusted range.

References Cited

UNITED STATES PATENTS 3,004,801   10/1961   Wrigley.
3,203,516   8/1965   Stelzer.

DUANE A. REGER, *Primary Examiner.*